May 10, 1960  J. S. REID  2,935,855
RUBBER BUMPER STRIP FOR DOCKS, PIERS OR OTHER STRUCTURES
Filed Sept. 21, 1956

INVENTOR.
JAMES S. REID
BY
Hyde, Meyer, Baldwin & Doran
ATTORNEYS

United States Patent Office 2,935,855
Patented May 10, 1960

2,935,855

RUBBER BUMPER STRIP FOR DOCKS, PIERS OR OTHER STRUCTURES

James S. Reid, Hudson, Ohio, assignor to The Standard Products Company, Cleveland, Ohio, a corporation of Ohio Application September 21, 1956, Serial No. 611,126

1 Claim. (Cl. 61—48)

This invention relates to bumper strips and more particularly, to a bumper strip of resilient rubber or rubber-like material for the cushioning or the absorption of collision impacts and for the protection of one or both of the colloiding objects. Although the present bumper strip is adapted for use in many places and in various fields, including the automotive and the building fields, it is particularly suitable for use on docks, piers or other marine structures for cushioning or absorbing the impact of boats coming into contact therewith and for protecting the surfaces of said boats.

The present invention has for its primary object the provision of such a bumper strip which is characterized by its structural simplicity, the economy of its manufacture, its long service life, and the effectiveness with which it performs its impact-cushioning and its surface-protecting functions.

A more specific object of the present invention is the provision of a bumper strip having an attaching base portion which is effectively re-inforced, such as by the use of a separate metal strip, so as to materially increase its tear resistance and thereby to enable attachment of the bumper strip to be of a firm, secure and permanent character.

Another specific object of the present invention is the provision of a bumper strip in which the front contacting part thereof contains a high percentage of wax or equivalent material, with the result that the surface of a boat sliding therealong will not be scuffed or marred, as will be readily understood.

Figure 1:
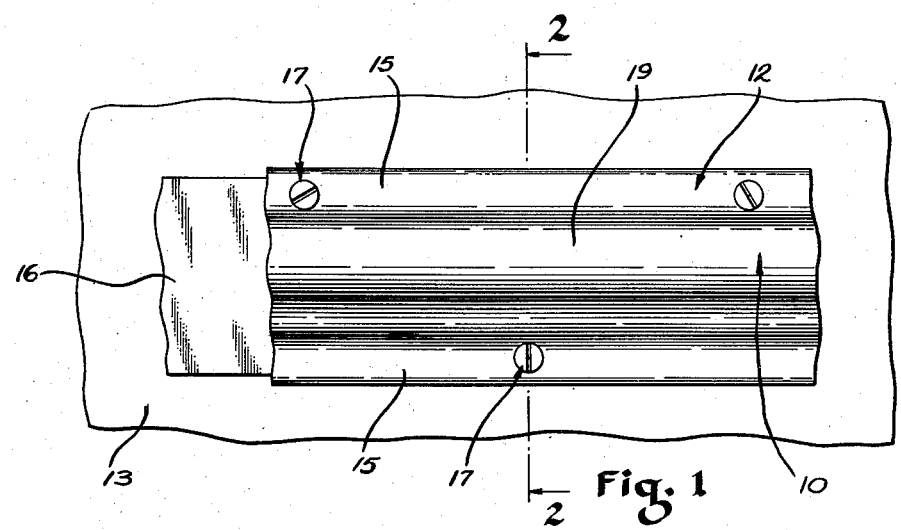
Figure 2:
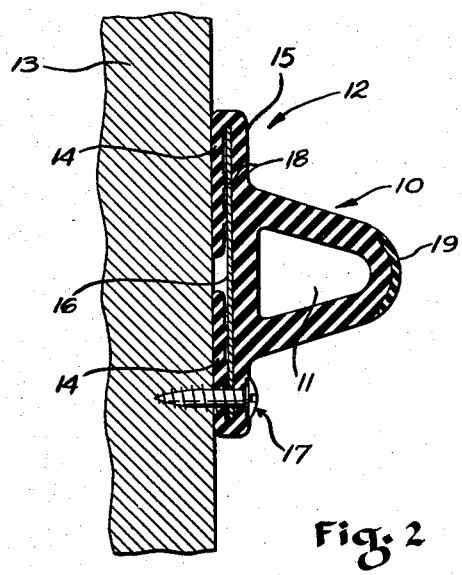

Further objects of the present invention, and certain of its practical advantages, will be referred to in or will be evident from the following description of one embodiment of the invention, as illustrated in the accompanying drawing, in which:

Fig. 1 is a front elevational view of a bumper strip embodying one form of the present invention, as attached to a dock, pier or other structure; and Fig. 2 is a cross-sectional view thereof, on the line 2—2, Fig. 1.

Before the bumper strip here illustrated is specifically described, it is to be understood that the present invention is not limited to the structural details or the particular arrangement of parts here shown, as bumper strips embodying the invention may take various forms. It also is to be understood that the terminology or phraseology herein used is for purposes of description and not of limitation, as the scope of the present invention is denoted by the appended claim.

For the disclosure of one embodiment of the present invention, there is here illustrated a bumper strip which includes a one-piece member of rubber or rubber-like material and which preferably is extruded in continuous lengths and then cut into the desired sections. Said bumper strip member comprises two main parts, namely (a) an impact-cushioning body portion 10 which may be of any suitable size and shape, the present body portion being of generally semi-elliptical form in cross section, with a longitudinally disposed cavity 11 for increased resiliency or flexibility, and (b) an attaching base portion 12, the one here shown being of generally flat form, with a width materially greater than that of the body portion 10 for the convenient attachment of said base portion to a dock, pier or other structure 13.

In the present embodiment of the invention, the base portion 12 of the rubber bumper strip member comprises two oppositely extending channel-shaped flanges with the rear, reversely bent flange portions 14 being closely spaced to the front flange portions 15 and terminating short of each other, as best shown in Fig. 2.

In the cross part of the T-shaped slot thus formed in the base portion 12 of the rubber bumper strip member is arranged a re-inforcing strip 16 of sheet metal or other suitable material, the effect of which is to materially increase the tear resistance of the base portion of the rubber strip and thus make more secure and permanent its attachment to a dock, pier or other structure, such as the structure 13 of Figs. 1 and 2.

As here shown, the re-inforcing base strip 16 has a width corresponding to that of the cross part of the T-shaped slot of the base portion 12 of the bumper strip and thus, a width but slightly smaller than that of said base portion.

Any suitable fastening elements such as pins, studs, screws, nails and the like, may be utilized for the attachment of the base portion of the bumper strip to a dock, pier or other structure, and such fastening elements may be driven through said base portion and into the dock, pier or other structure by either manual force or by the use of power tools. In the present embodiment of the invention, screws 17 constitute the fastening elements but it is to be understood that they are illustrative only.

If desired and as here shown, the reversely bent, rear flange portions 14 of the rubber bumper strip member may be formed with longitudinally disposed ribs or ridges 18 on the front surfaces thereof for engagement with the re-inforcing base strip 16, there being two such ribs or ridges, in laterally spaced relation, on each of the flange portions 14 in the embodiment of the invention here shown.

To more effectively prevent scuffing or marring of a boat or other surface in its contact with the present bumper strip, particularly when sliding therealong, the rubber body portion 12 of said bumper strip has bonded or otherwise securely united thereof, along its front, with a layer 19 of rubber or the like containing a high percentage of wax or equivalent material. As the result of said layer 19, which is here of arcuate form in cross section, the bumper strip body portion 12 has a front contact part of waxy form or low frictional characteristics, along which the surface of a boat or other object can readily slide with no scuffing or marring thereof.

As heretofore mentioned, although the present bumper strip is particularly useful on docks, piers or other marine structures, including boats, said bumper strip has an almost unlimited field of use in the absorption or cushioning of collision impacts.

To those skilled in the art to which the present invention relates, other features and advantages of rubber bumper strips embodying the invention will be evident from the foregoing description of one such embodiment.

Having described my invention, I claim:

A bumper strip for docks, piers or other structures, comprising an impact-cushioning body portion of resilient rubber or rubber-like material and provided with a longitudinally disposed cavity for increased resiliency of said body portion, said body portion also being provided at the front thereof with a separate layer of rubber or rubber-like material containing a relatively high percentage of a wax-like material to thereby form a contact part of reduced frictional characteristics, and a generally flat attaching base portion integral with and of lesser thickness than said body portion, said base portion having parts projecting laterally outwardly beyond said body portion for convenient attachability of the bumper strip.

References Cited in the file of this patent

UNITED STATES PATENTS

| | | |
|---|---|---|
| 1,985,261 | O'Hare | Dec. 25, 1934 |
| 2,027,800 | Whitlock | Jan. 14, 1936 |
| 2,756,016 | Painter | July 24, 1956 |

FOREIGN PATENTS

| | | |
|---|---|---|
| 500,689 | Great Britain | Feb. 14, 1939 |
| 673,754 | Great Britain | June 11, 1952 |

OTHER REFERENCES

Gustran: German application Serial No. P. 10,741 printed December 15, 1955.